United States Patent
Lee

(10) Patent No.: US 8,976,150 B2
(45) Date of Patent: Mar. 10, 2015

(54) METHOD, SYSTEM AND TERMINAL FOR SUPPORTING TOUCH FUNCTION

(71) Applicant: Samsung Electronics Co. Ltd., Suwon-si, Gyeonggi-do (KR)

(72) Inventor: June Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 13/670,866

(22) Filed: Nov. 7, 2012

(65) Prior Publication Data

US 2013/0113754 A1 May 9, 2013

(30) Foreign Application Priority Data

Nov. 9, 2011 (KR) .................. 10-2011-0116252

(51) Int. Cl.
*G06F 3/045* (2006.01)
*G06F 3/044* (2006.01)
*G06F 3/0354* (2013.01)

(52) U.S. Cl.
CPC ............ *G06F 3/044* (2013.01); *G06F 3/03545* (2013.01)
USPC .......................................... 345/174

(58) Field of Classification Search
CPC ............................. G06F 3/044; G06F 3/03545
USPC .................... 345/156–184; 178/18.01–18.06; 715/776

See application file for complete search history.

(56) References Cited

U.S. PATENT DOCUMENTS

| | | | |
|---|---|---|---|
| 5,113,041 A * | 5/1992 | Blonder et al. ............... | 345/173 |
| 6,492,979 B1 * | 12/2002 | Kent et al. ..................... | 345/173 |
| 2004/0100454 A1 * | 5/2004 | Kang et al. .................... | 345/173 |
| 2007/0230778 A1 * | 10/2007 | Matulic ......................... | 382/165 |
| 2008/0236902 A1 * | 10/2008 | Imaizumi .................. | 178/18.01 |
| 2009/0153522 A1 * | 6/2009 | Chou ............................. | 345/175 |
| 2012/0327045 A1 * | 12/2012 | Skinner ......................... | 345/179 |
| 2013/0076701 A1 * | 3/2013 | Wu ................................ | 345/179 |
| 2013/0106771 A1 * | 5/2013 | Bakken et al. ................ | 345/174 |
| 2013/0155015 A1 * | 6/2013 | Chang ........................... | 345/174 |

* cited by examiner

*Primary Examiner* — Prabodh M Dharia
(74) *Attorney, Agent, or Firm* — Jefferson IP Law, LLP

(57) ABSTRACT

A method and a system for supporting a touch function on a terminal for performing a touch operation in which a writing pressure is applied to a touch pen of the system including the touch pen and a terminal are provided. The method includes touching a touch pen to a touch panel of the terminal, the touch pen having a capacitance that corresponds to and varies with pressure applied to the touch pen, generating, by the terminal, an instruction word corresponding to a result of adding the capacitance corresponding to the pressure applied to the touch pen when the touch pen is touched to the terminal and a capacitance of the touch panel, and performing a user function corresponding to the instruction word.

20 Claims, 9 Drawing Sheets

METHOD, SYSTEM AND TERMINAL FOR SUPPORTING TOUCH FUNCTION

PRIORITY

This application claims the benefit under 35 U.S.C. §119 (a) of a Korean patent application filed on Nov. 9, 2011 in the Korean Intellectual Property Office and assigned Serial No. 10-2011-0116252, the entire disclosure of which is hereby incorporated by reference.

BACKGROUND OF THE INVENTION

1. Field of the Invention

The present invention relates to a touch operation. More particularly, the present invention relates to a method for supporting a touch operation in which pressure of the touch operations, such as a writing pressure, is applied in a system for supporting a touch function including a touch pen and a terminal, and a system and a terminal for supporting the same.

2. Description of the Related Art

A portable terminal supports specific user functions and is small enough to be portable, and thus, the portable terminal is ubiquitous in modern life. In recent years, a portable terminal that integrally supports various user functions have appeared, and functions of various complex user functions and searching for various information provided via the Internet are provided by the portable terminal. However, in such a case, a small display area of the portable terminal is inconvenient for a user. Thus, a recent portable terminal has evolved so as to have a larger display area.

However, since the portable terminal provides portability, even with a relatively large display area, there is a limitation on its display area because of the need for portability. Thus, although a prior portable terminal may have a relatively large display area, it is still inconvenient to select and operate contents displayed on the display area in this case.

A touch pen has been identified as a solution for reducing this inconvenience. The touch pen may have a sharper end point than a finger, such that the touch pen may provide a more delicate selection and operation in an area of a display which supports a touch function in comparison to a user's finger. However, since the touch pen provides a simple touch function, it has a disadvantage that suitable functionality may not be provided to a user. That is, since a prior touch pen is provided only for replacing operations executed by fingers, a user may feel no need to operate a portable terminal using the touch pen.

SUMMARY OF THE INVENTION

Aspects of the present invention are to address at least the above-mentioned problems and/or disadvantages and to provide at least the advantages described below. Accordingly, an aspect of the present invention is to provide a method of supporting a touch function which increases operability of a terminal as well as user convenience by providing a touch pen on which very various functions are installed, a system and a terminal thereof.

In accordance with an aspect of the present invention, a method for supporting a touch function on a terminal is provided. The method includes touching a touch pen to a touch panel of the terminal, the touch pen having a capacitance that corresponds to and varies with pressure applied to the touch pen, generating, by the terminal, an instruction word corresponding to a result of adding the capacitance corresponding to the pressure applied to the touch pen when the touch pen is touched to the terminal and a capacitance of the touch panel, and performing a user function corresponding to the instruction.

In accordance with another aspect of the present invention, a system for supporting a touch function is provided. The system includes a touch pen having a capacitance of a capacitor body connected to a nib of the touch pen, the capacitance being varied according to pressure applied to the nib, and a terminal including a touch panel which the touch pen touches, the terminal being for sensing a capacitance variation at a touch point, for generating an instruction word according to the capacitance variation, and for executing a specific user function based on the instruction word.

In accordance with another aspect of the present invention, a terminal for supporting a touch function using a touch pen is provided. The terminal includes a touch panel to which the touch pen is touched, the touch pen generating a capacitance that varied according to pressure applied to a nib of the touch pen, the nib being disposed at one end of the touch pen, and a controller for detecting a capacitance variation generated by a touch event of the touch pen at a specific point of the touch panel, for generating an instruction word corresponding to the detected capacitance variation, and for controlling san execution of a specific touch function that is performed according to the detected capacitance variation.

In accordance with another aspect of the present invention, a touch pen for supporting a touch function of a terminal having a touch screen is provided. The touch pen includes a case, a nib disposed so as to protrude from an end of the case, and a writing pressure variable capacitor having a capacitor body, a capacitance of the writing pressure variable capacitor being varied according to pressure applied to the nib.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
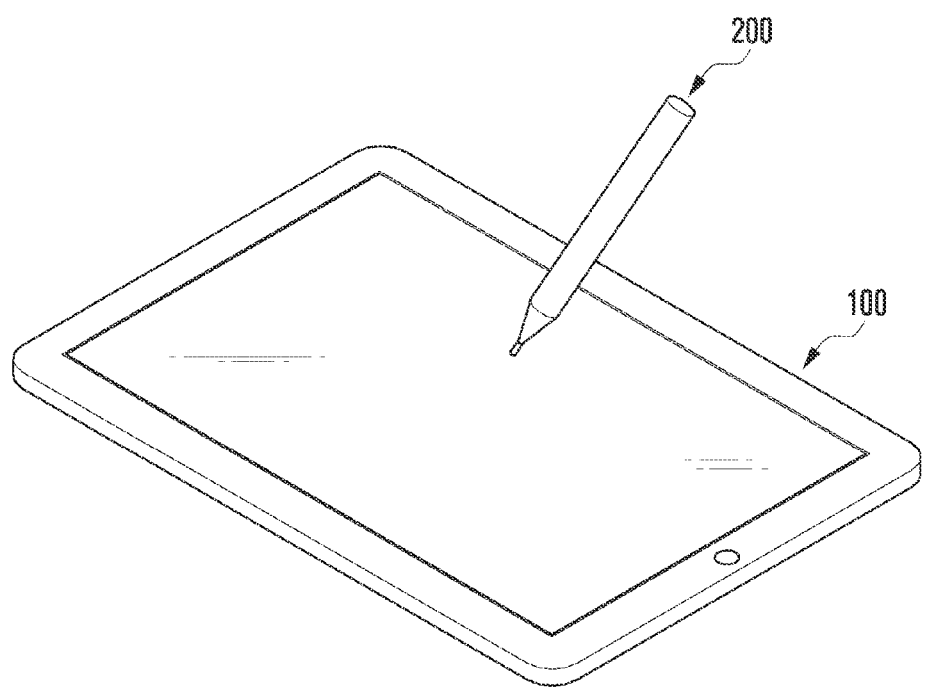
FIG. 1 schematically illustrates a configuration of a system for supporting a touch function according to an exemplary embodiment of the present invention.

FIG. 1 schematically illustrates a configuration of a system for supporting a touch function according to an exemplary embodiment of the present invention.

Referring to FIG. 1, a system 10 for supporting a touch function includes a touch pen 200 that is able to sense a writing pressure and a terminal 100 for supporting a touch function in conjunction with the touch pen 200.

The system 10 may distinguish and sense a capacitance of the touch pen 200 according to a pressure or strength of a touch of the touch pen 200, as the electrostatic capacity is varied according to the pressure applied to the touch pen 200 after touching the touch pen 200 to the terminal 100. Thus, the system 10 may generate various instruction words according to the pressure, that is a writing pressure, applied to the touch pen 200, and may support a user function operation or an operation of various user functions according to the instruction words.

The touch pen 200 may have a shape and appearance of a pen and an internal structure including a plurality of capacitors that are disposed therein. However, the present invention is not limited thereto, and any suitable shape, appearance and internal structure of a touch pen may be used. In a case where a user grasps the touch pen 200 and the touch pen 200 is touched to a touch panel of the terminal 100, then the touch pen 200 may vary or increase a capacitance of the plurality of capacitors disposed in the touch pen 200. Furthermore, in such a case, the variance or increase in capacitance sensed on a touch panel of the terminal 100 may be provided to the terminal 100. At this time, at least one capacitor of the plurality of capacitors disposed in the touch pen 200 may be configured to allow its capacitance to be varied according to the pressure applied to or by the touch pen 200.

The terminal 100 may have a display unit including a touch panel that senses a capacitance variation of the touch pen 200 which is touched to the touch panel, and may determine a location or a touch point of a touch event on the touch panel. The terminal 100 may identify an amount of capacitance of a touch event generated at the touch point, and may support generation of a new instruction word according to a variation in the capacitance. Thus, by sensing the capacitance variation of the touch pen 200 touched to the touch panel, the terminal 100 may generate various instruction words used for a specific user function according to the capacitance variation, or may generate an instruction word used for various user functions to support operations of the various user functions. Accordingly, a user may operate and execute various touch functions according to a writing pressure.

As described above, when operating the touch pen 200, the system for supporting a touch function according to an exemplary embodiment may detect and/or sense the capacitance variation according to the writing pressure and use the detected and/or sensed capacitance variation for a function operation.

Figure 2:
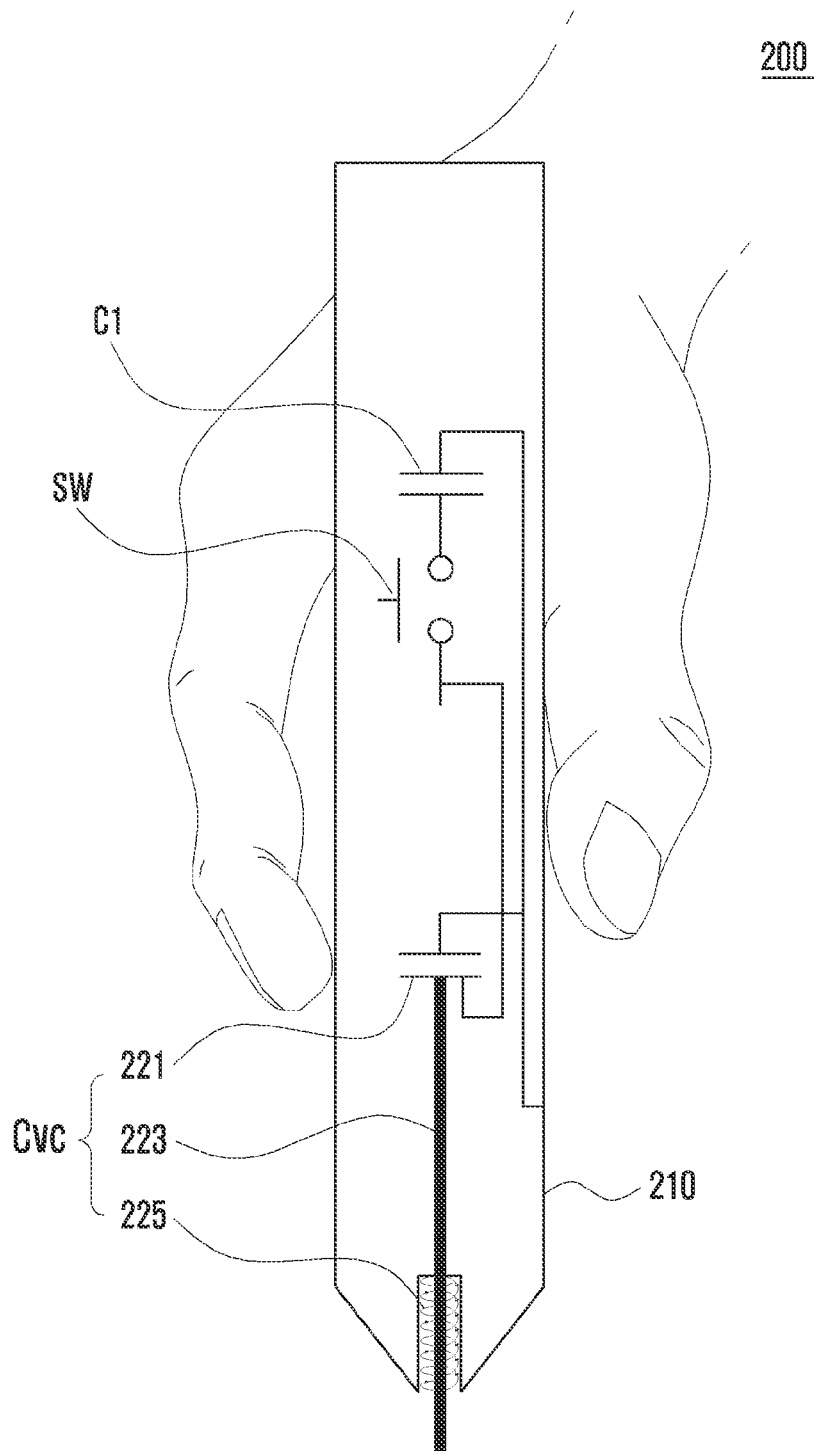
FIG. 2 schematically illustrates internal and external configurations of a touch pen according to an exemplary embodiment of the present invention.

FIG. 2 illustrates internal and external configurations of a touch pen in more detail according to an exemplary embodiment of the present invention.

Referring to FIG. 2, a touch pen 200 may include a case 210, a writing pressure variable capacitor Cvc that is disposed inside of the case 210, at least one supplementary capacitor C1 for supporting additional user functions, and a switch SW for supporting selective contact of the supplementary capacitor C1.

The case 210 may have a shape of a pen. That is, the case 210 may be made of a hollow cylinder having an end portion or cover at a first side and a diameter which is gradually reduced, in a direction from the first side to a second side opposite the first side, so as to form a protrusion, i.e., a touch point side for executing touches on the touch panel. A nib 223 may be provided such that it extends along passage provided at an inside of the case 210 at a side of the protrusion. Thus, the nib 223 may be installed in the passage formed in the protrusion and may be disposed such that it may be touched to the touch panel of the terminal 100. Additionally, various structures for a grasp of a user or for increasing a user's grip of the touch pen 200, such as a cover made of urethane or plastics for increasing grip feeling, may cover an outer wall or a portion of the case 210. However, the present invention is not limited thereto, and various structures on the outside of the case 210 may be removed according a selection of a designer.

This case 210 may be formed of a conductive material, for example, a portion, a plurality of portions, and an entirety of the case 210 may be formed of the conductive material, or may be formed of a non-conductive material. Thus with the case 210 formed of a conductive material, when a user grips one side of the case 210 with one hand, the user's hand is electrically and/or conductively connected to the inside of the case 210. In such a case, the capacitances of the writing pressure variable capacitor Cvc and of the user hand are added together or combined. The added capacitance may be provided to the terminal 100 and added to a capacitance of a panel capacitor disposed at a specific point of the touch panel. Furthermore, the case 210 may be formed of a nonconductive material, such as plastics. As such, although the addition of capacitance by the user hand is removed, when the writing pressure variable capacitor Cvc is connected to the touch panel of the terminal 100, a capacitance of the writing pressure variable capacitor Cvc may be added to a capacitance of the touch panel of the terminal 100. Thus, the terminal 100 may detect a point at which the capacitance of the touch panel is varied by using the capacitance of the writing pressure variable capacitor Cvc to determine which point is selected or touched by the touch pen 200.

As discussed above, the writing pressure variable capacitor Cvc is disposed inside of the case 210 and its capacitance is varied according to the pressure applied by a user to the nib 223. The writing pressure variable capacitor Cvc may include the nib 223 which is touched to the touch panel of the terminal 100, a capacitor body 221 connected to the nib 223, wherein both conductive electrode plates of the capacitor body forms a capacitor and a distance is varied between according to the pressure applied to the nib 223, and an elastic structure 225 for allowing the nib 223 to return to its previous position. Furthermore, the capacitor body 221 is connected in parallel to the supplementary capacitor C1, such that a selective addition of capacitances may be performed.

The nib 223 may have a predetermined length, may be disposed in the passage of the case 210, as previously described, and may be provided in a form so as to be protruding its end from the touch pen 200. One side of the nib 223 may be connected to the capacitor body 221 and the other side of the nib 223 may be protruding from the touch pen 200 so as to be touched to a specific point of the touch panel of the terminal 100 by a user. At this time, in order to form an added capacitance along the nib 223, the nib 223 may be formed by using a conductive material, such as aluminum, rubber, or other similar and suitable conductive materials. Specifically, the protruding end of the nib 223 may have a round shape for preventing the touch panel from being damaged, however, the present invention is not limited thereto, and the protruding end of the nib 223 may be any suitable shape.

The capacitor body 221 includes an insulation material disposed at a central portion of the capacitor body 221 and two conductive electrode plates for encasing both sides of the insulation material. One of the two conductive electrode plates may be connected in parallel to the supplementary capacitor C1, and the other electrode plate may be connected to the nib 223. Specifically, the distance between the two conductive electrode plates of the capacitor body 221 may be varied by the pressure applied via the nib 223. To do this, the insulation material disposed between the electrode plates may be made of an elastic material or any suitable flexible material. Although the capacitor body 221 is depicted in FIG. 2 as when pressure is applied to the nib 223 such that the conductive electrode plates are depicted as being close to each other, the present invention is not limited thereto, and the conductive electrode plates may be varying distances from each other. That is, the conductive electrode plates of the capacitor body 221 may be designed to increase the distance between them when pressure is applied to the nib 223.

When the elastic structure 225 is connected to the nib 223 and the nib 223 moves in a direction from the protruding end towards the inside of the case 210, the elastic structure 225 may provide elastic force by which the nib 223 returns to the original position. When one portion of the elastic structure 225 is fixed at a location of the protruding end of the nib 223, another portion of the nib 223 is connected to a specific area of the nib 223 such that the nib 223 moves in one direction and the elastic structure 225 may provide elastic force to the nib 223 such that the nib 223 returns to its original position. Although in present exemplary embodiments, the elastic structure 225 is depicted as a spring shape, the present invention is not limited thereto and the elastic structure may be provided by adapting a structure having various shapes, such as a plate shape, a clip shape, or any other suitable shape providing the elastic forces or other similar forces as described above with respect to the elastic structure 225.

One side of the supplementary capacitor C1 may be connected to the writing pressure variable capacitor Cvc and the other side of the supplementary capacitor C1 may be connected to the switch SW. The supplementary capacitor C1 may be designed so as to have a fixed capacitance. The supplementary capacitor C1 is disposed at a predetermined position inside the case 210 and may be either connected in parallel to, or separated from, the writing pressure variable capacitor Cvc according to a control of the switch SW. When the supplementary capacitor C1 is connected in parallel to the writing pressure variable capacitor Cvc, then the supplementary capacitor C1 performs a function of adding the fixed capacitance value of the supplementary capacitor C1 to a capacitance value of the writing pressure variable capacitor Cvc.

The switch SW is disposed between the supplementary capacitor C1 and the writing pressure variable capacitor Cvc and performs the function of selectively connecting the supplementary capacitor C1 to the writing pressure variable capacitor Cvc according to a user's control. The switch SW may be provided as a form of supporting a connection and a release according to a mechanical control. For example, the switch SW may implemented in various forms such as a push switch, a push-lock switch, a toggle switch, a locker switch, a sliding switch, or any other similar or suitable element providing a switching function.

Meanwhile, although the touch pen 200 is described as having one supplementary capacitor C1 that is connected through the switch SW to the writing pressure variable capacitor Cvc, the present invention is not limited thereto. That is, it is possible to use a plurality of supplementary capacitors C1 together with additional switches SW. Thus, the touch pen 200 may provide various variations of the capacitance value through the control of the switch SW.

An equivalent circuit of the touch pen 200 and another equivalent circuits of the touch pen 200, with respect to either a turn-on or a turn-off sate of the switch SW, will be described more in detail with reference to FIGS. 3 to 5.

Figure 3:
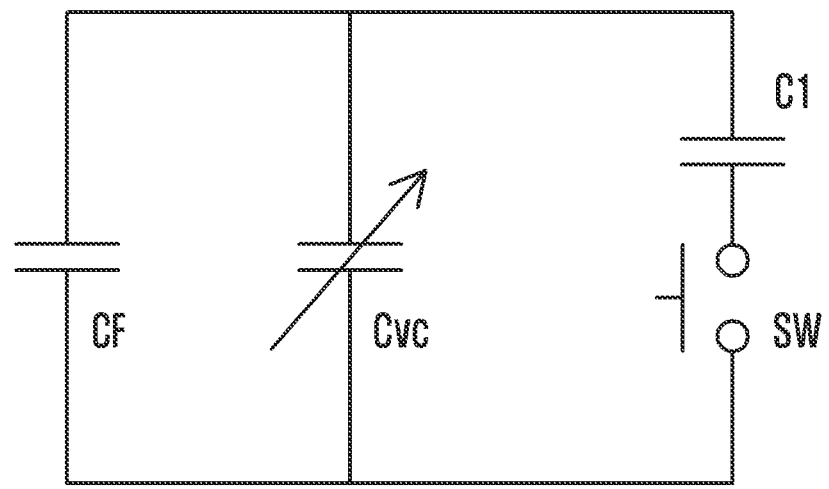
FIG. 3 schematically illustrates an equivalent circuit of a touch pen according to an exemplary embodiment of the present invention.

FIG. 3 schematically illustrates an equivalent circuit corresponding to a touch pen according to an exemplary embodiment of the present invention. FIG. 4 illustrates an equivalent circuit of a touch pen 200 in a turn-off state of a switch SW according to an exemplary embodiment of the present invention. And, FIG. 5 illustrates an equivalent circuit of a touch pen in a turn-on state of a switch SW according to an exemplary embodiment of the present invention.

First, referring to FIG. 3, a touch pen 200 includes an additional capacitor CF generated by a grip of one of a finger or a palm of a user, the writing pressure variable capacitor Cvc disposed in the case 210, and a switch SW. The additional capacitor CF is connected in parallel to the writing pressure variable capacitor Cvc. The supplementary capacitor C1 is connected to the writing pressure variable capacitor Cvc. The switch SW is disposed between the supplementary capacitor C1 and the writing pressure variable capacitor Cvc in order to support a selective connection of the supplementary capacitor C1.

As such, the touch pen 200 generates an additional capacitance by connecting the additional capacitor CF in parallel to the writing pressure variable capacitor Cvc. Meanwhile, as described above, the additional capacitor CF may be omitted by a material characteristic of the case 210 and intention of a designer such that a selected material of the case 210 will have a conductivity preventing the additional capacitor CF from being formed.

Figure 4:
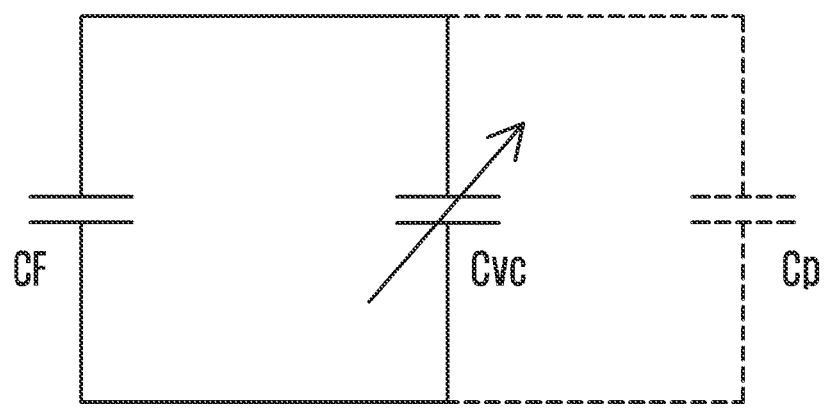
FIG. 4 illustrates an equivalent circuit of a turn-off state of a switch of a touch pen according to an exemplary embodiment of the present invention.

Meanwhile, when the switch SW maintains the turn-off state, the touch pen 200 of the present exemplary embodiments may have an equivalent circuit as shown in FIG. 4. That is, the supplementary capacitor C1 is isolated by the switch SW, and thus, is not shown in FIG. 4, and the additional capacitor CF and the writing pressure variable capacitor Cvc are connected in parallel with each other. As the result, the terminal 100 detects capacitances of the additional capacitor CF, the writing pressure variable capacitor Cvc and a panel capacitor Cp. Here, the capacitance of the writing pressure variable capacitor Cvc may be varied according to the pressure applied to the touch pen 200.

Figure 5:
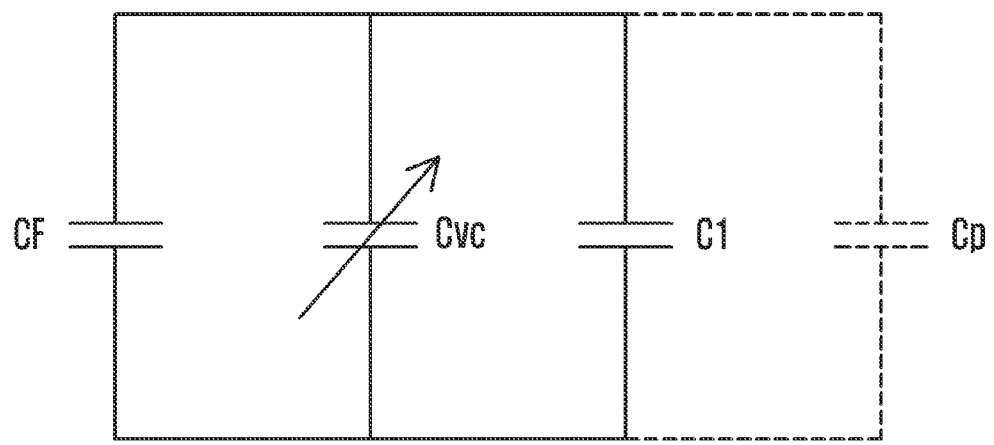
FIG. 5 illustrates an equivalent circuit of a turn-on state of a switch of a touch pen according to an exemplary embodiment of the present invention.

Furthermore, when the switch SW is changed to the turn-on state, the touch pen 200 of the present exemplary embodiments may have an equivalent circuit as shown in FIG. 5. That is, the supplementary capacitor C1 is connected in parallel to the writing pressure variable capacitor Cvc by the switch SW, and in such a case, the additional capacitor CF, the writing pressure variable capacitor Cvc and the supplementary capacitor C1 of the touch pen 200 are connected in parallel with one another as a whole. In this state, when the nib 223 touches the touch panel of the terminal 100, as depicted in FIG. 1, the panel capacitor Cp may be connected in parallel to the supplementary capacitor C1. As the result, a capacitance, which is detected by the terminal 100 at a touch point where the touch pen 200 is touched to the terminal 100, is an addition or sum of capacitances of the additional capacitor CF, the writing pressure variable capacitor Cvc, the supplementary capacitor C1 and the panel capacitor Cp. In such a case, the terminal 100 may generate an instruction word corresponding to the addition or the sum of all of the capacitances of the capacitors depicted in FIG. 5.

Figure 6:
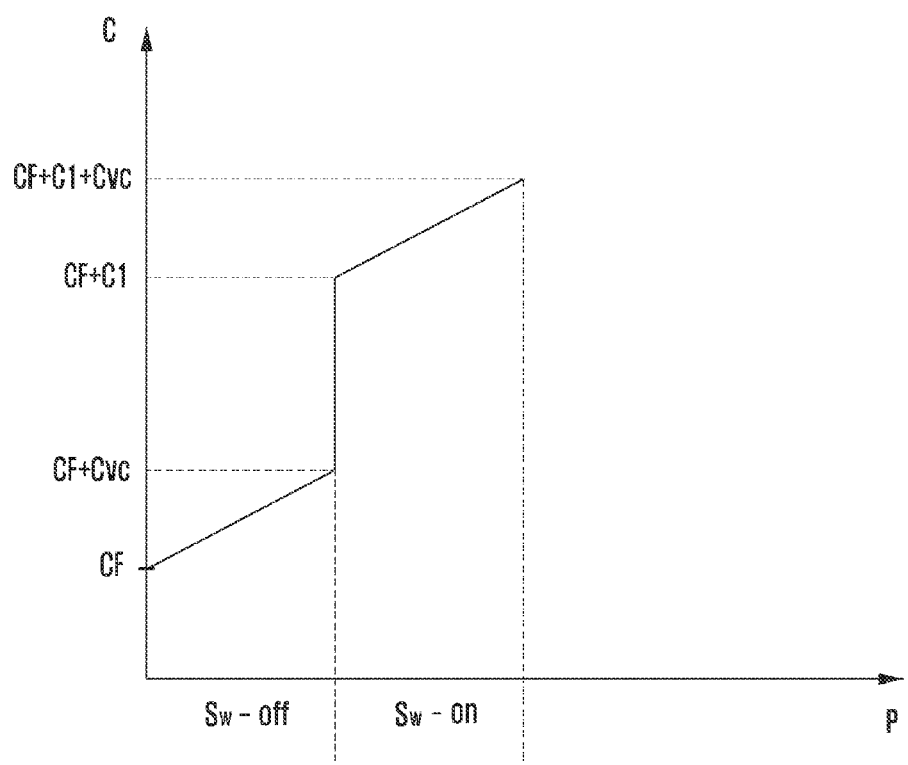
FIG. 6 is a graph illustrating a capacitance variation of a touch pen according to an exemplary embodiment of the present invention.

FIG. 6 is a graph illustrating a capacitance variation of a touch pen of a system for supporting a touch function according to an exemplary embodiment of the present invention. In the description provided below, it is assumed that the writing pressure variable capacitor Cvc is designed such that when pressure is applied to the nib, a distance between the conductive electrode plates of the writing pressure variable capacitor Cvc is increased.

Referring to FIG. 6, first, it is assumed that a switch SW of a touch pen 200 is in a turn-off state. When a user grips the case 210 of the touch pen 200, the touch pen 200 has a capacitance value corresponding to that of the additional capacitor CF. Then, when the user performs an action of pushing the nib 223 in an upward direction by applying pressure to the nib 223, by, for example, an action of pulling the case 210 in a downward direction after touching the nib 223 to a surface of a specific object, then, as the pressure is increased, the distance between the conductive electrode plates included in the capacitor body of the writing pressure variable capacitor Cvc is decreased, such that the capacitance value of the writing pressure variable capacitor Cvc is increased. The graph of FIG. 6 is depicted so as to assume that a uniform pressure is gradually increased. Thus, the touch pen 200 may be shown as a type of gradually increasing capacitance from a first capacitance value of the additional capacitor CF as the writing pressure is increased.

Although, in the description above, it is assumed that when pressure is applied to the nib 223, the capacitance of the writing pressure variable capacitor Cvc is increased, the present invention is not limited thereto. That is, when pressure is applied to the nib 223, the variable capacitor may be configured to increase the distance between the conductive electrode plates included in the capacitor body, such that the capacitance value is decreased.

Meanwhile, when the state of the switch SW is turned on when the user grips the touch pen 200, as depicted in FIG. 2, an addition value or sum of capacitances of the additional capacitor CF and the supplementary capacitor C1 may be determined as an initial capacitance value of the touch pen 200. Then, when the capacitance of the writing pressure variable capacitor Cvc is increased as a user applies pressure to the nib 223, as in the graph depicted in FIG. 6, in a turn-on state of the switch SW, the capacitance may be gradually increased. Accordingly, a gradual increase of a capacitance value may be the result of summing up the capacitance values of the additional capacitor CF, the supplementary capacitor C1 and the writing pressure variable capacitor Cvc, as shown in FIG. 6.

In the description above, the variation of the capacitance value of the touch pen 200 has been described in the state where the touch pen 200 is not touched to the touch panel 143. Thus, in a state where the touch panel 143 is touched and the switch SW is turned off, the sum of the capacitances of the additional capacitor CF and the panel capacitor Cp of the touch panel may be the initial value of the system 10 for supporting a touch function according to a grip of a user. Furthermore, in a state where the switch SW is turned on, the sum of the capacitances of the additional capacitor CF, the supplementary capacitor C1 and the panel capacitor Cp of the touch panel may be the initial value of the system 10 for supporting a touch function according to a grip of a user.

As described above, by providing the writing pressure variable capacitor Cvc, the capacitance of which is varied according to pressure applied by a user, the touch pen 200 of the system 10 for supporting a touch function may generate instruction words according to the capacitance values varied while the user grips the touch pen 200 and uses the touch pen 200 on the touch panel of the terminal 100. For example, the system 10 may support a sensitive mode operation that automatically displays lines having various thicknesses according the pressure applied to the touch pen 200 by mapping a line type, such as a thickness of a line, to a capacitance value.

Figure 7:
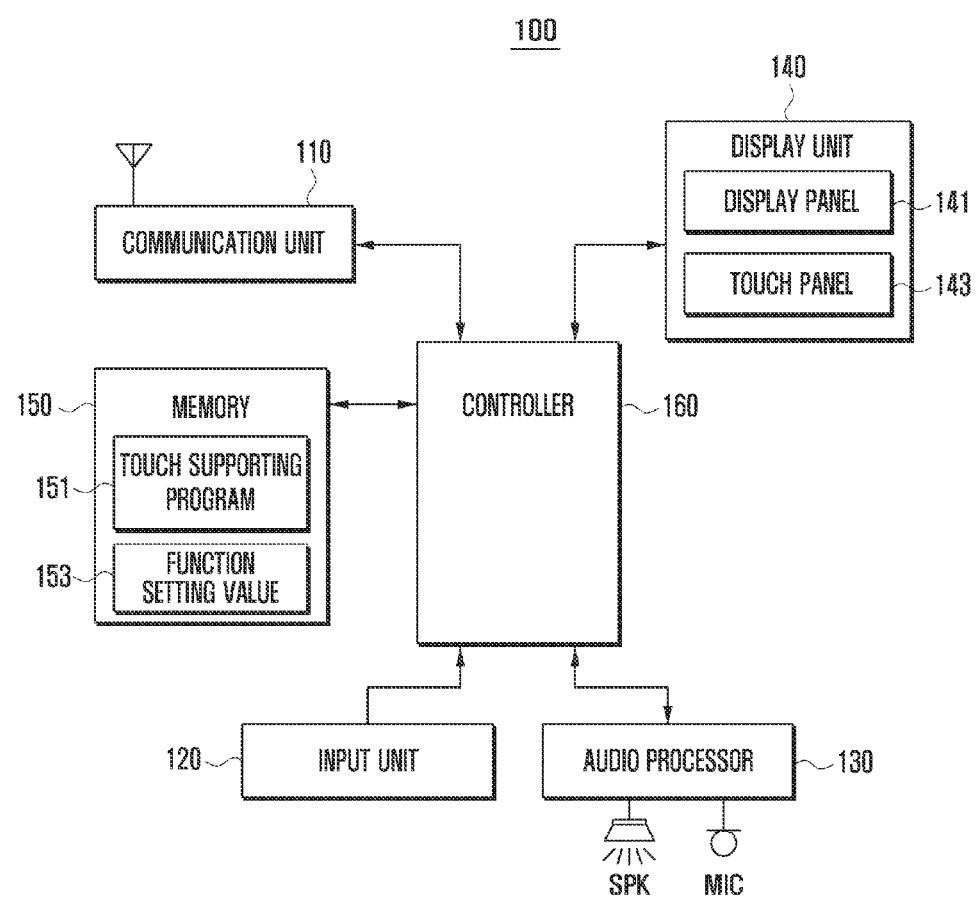
FIG. 7 is a block diagram illustrating a configuration of a terminal according to an exemplary embodiment of the present invention.

FIG. 7 is a block diagram illustrating in detail a configuration of a terminal according to an exemplary embodiment of the present invention.

Referring FIG. 7, a terminal 100 may include a communication unit 110, an input unit 120, an audio processor 130, a display unit 140, a memory 150, and a controller 160. The display unit 140 includes a touch panel 143 for providing a touch screen function and a display panel 141 for providing a display image. When the touch pen 200 is touched on the display unit 140, the terminal 100 detects a capacitance at the touched point and generates an instruction word according to an amount of the detected capacitance. The terminal 100 may perform a user function operation according to the generated instruction word. Thus, when the terminal 100 performs a specific operation on the touch panel using the touch pen 200, the terminal 100 may support a variety of adaptive function operations since various user function applications may be performed according to corresponding operation characteristic. For example, the terminal 100 may provide a sensitivity function which performs a different type of a touch function according to the pressure applied to the touch pen 200 by a user.

The communication unit 110 provides a communication function for the terminal 100. However, the present invention is not limited thereto, and the communication unit 110 may be omitted from the terminal 100 when the terminal 100 does not support a communication function. Meanwhile, the communication unit 110 may be provided as a type of a mobile communication module for supporting a communication function and more specifically, a mobile communication function. The communication unit 110 forms a communication channel with a mobile communication system to support signal transmission and/or reception for performing a mobile communication function of the terminal 100. For example, the communication unit 110 may form at least one of a voice service channel, a video service channel, and a data service channel with a mobile communication system and/or mobile communication network, and support transmission/reception of a specific signal through a corresponding service channel in order to provide wireless communications.

Specifically, the communication unit 110 may perform the transmission and/or reception of a written message when the touch function of the present exemplary embodiments is related to a writing and the transmission and/or reception of a communication message. For example, when two terminals perform transmission and/or reception of information with each other in a scheme of writing letters in a writing window, a user may perform message writing while applying various pressures using the touch pen 200. The written message may include information about a type of letter, such as a font, a thickness, a color, which is varied according to the various pressures using the touch pen 200. Then, the communication unit 110 may transmit the written message to another terminal in real time or at an activating of the message transmitting function. As described above, the touch function of the present exemplary embodiments makes it possible to write more easily and quickly when generating various types of messages in operating the communication unit 110, such that the communication unit 110 provides diversified and simplified message-based communication functions.

For example, a user may automatically perform writing of letters of various thicknesses or various fonts, or switching of image depictions, by controlling an amount of pressure applied to the touch pen 200. Furthermore, a user may easily perform functions of deleting or transmitting a portion or the whole of a written message through an operation control of the switch SW of the touch pen 200. That is, using an operation control of the switch SW of the touch pen 200, a user may easily perform a mode switching between a data input mode and an input data operating mode. To do this, the controller 160 may control instruction word generation and various applications for performing a function mapped so as to correspond to each capacitance according to a capacitance variation input from the touch pen 200.

The input unit 120 generates various input signals used for operating the terminal 100. The input unit 120 may be implemented with various input means, such as a keyboard, a keypad, a key button, or other similar input units, elements and apparatuses. Furthermore, when the display unit 140 is a touch screen, the input unit 120 may be implemented as a type of a touch map output to or displayed on the touch screen. The input unit 120 may generate an input signal for operating, i.e., starting or releasing, a sensitive mode based on the touch pen 200. When operating in the sensitive mode, the terminal 100 senses a capacitance variation according to a touch of the touch pen 200 such that the terminal 100 performs the instruction word generation. And, when not operating in the sensitive mode, the terminal 100 does not sense a capacitance variation, but rather, determines whether the capacitance is varied according to a touch of the touch pen 200, such that the terminal 100 supports generating an instruction word.

The audio processor 130 may output various audio data during an operating procedure of the terminal 100, such as audio data according to a playback of an audio file stored in the memory 150, audio data received from an external source, or other similar types of audio data. Furthermore, the audio processor 130 may support a function of collecting audio data. The audio processor 130 may include a speaker SPK and a microphone MIC. Specifically, the audio processor 130 may support outputting of various guide sound according to an operation of the touch pen 200. For example, the audio processor 130 may output a guide sound about whether a sensitive mode is set at the time point of activating the touch panel and initially sensing the touch panel or at another specific time point. Thus, a user determines whether the sensitive mode is currently applied to the touch pen 200, and then may perform the mode control of the terminal 100.

The display unit 140 provides various display interfaces for operating the terminal 100. For example, the display unit 140 supports a standby picture or a menu picture for operating the terminal 100. Specifically, the display unit 140 may provide various pictures, such as a message writing picture, using the touch pen 200, a picture drawing picture, a memo writing picture, or other similar pictures and images. Furthermore, the display unit 140 may support a specific user function picture, such as various game operation pictures or any other pictures or images used for or displayed during operation of the terminal 100.

This display unit 140 may be provided in a type of a touch screen which is an overlap type of the display panel 141 and the touch panel 143. Images or texts corresponding to the above-described various pictures may be output to the display panel 141. A valid touch area and an invalid touch area may be established in the touch panel 143 according picture characteristics output to the touch panel 141. The touch panel 142 may transfer information corresponding to a touch event generated in the valid touch area to the controller 160. Specifically, the touch panel 143 may be provided in a matrix type, such that a capacitance variation generated at various points by a contact of the touch pen 200 may be determined. That is, when a contact of the touch pen 200 is generated, the touch panel 143 of the present exemplary embodiments may transfer not only information about a contact point and a contact time, but also a capacitance variance value that is varied according to pressure applied to the touch pen 200, to the controller 160.

The memory 150 may store various operating systems and various application programs and algorithms used for operating the terminal 100. Specifically, the memory 150 may store a touch supporting program 151 for supporting a touch function based on the touch pen 200 and a function setting value 153 including various setting values for operating the touch supporting program 151.

The touch supporting program 151 is a program for supporting a touch function of the present exemplary embodiments. When an electric power source is provided to the touch panel 143, the touch supporting program 151 may be loaded on the controller 160 in order to support a function for operating the touch panel 143. To do this, the touch supporting program 151 may include a routine of supporting activation of the touch panel 143, a routine of identifying a sensitive mode setting, a routine of detecting a point at which a touch event is generated, i.e., a location on the touch panel 143 at which the touch occurs, a time at which the touch event is generated, a routine of generating an instruction word corresponding to an amount of capacitance which is generated by the touch event based on the function setting value 153, a routine of performing a user function operation according to the instruction word, and any other similar and suitable routines and functions. Furthermore, the touch supporting program 151 may include a routine of collecting information about a point and a time at which a touch event is generated on the touch panel 143 when releasing the sensitive mode setting, and a routine of performing a function application according to the generated touch event.

The function setting value 153 includes setting values which define a user function corresponding to the touch event generated from the touch panel 143 of the terminal 100. That is, the function setting value 153 may include information on a kind of a user function, instruction words applied in a state of activating a corresponding user function, and a plurality of touch events corresponding to each instruction word. At this time, the plurality of touch events may include defined values, wherein capacitances of which are different from one another. Thus, when a touch event having specific capacitance is generated, a specific one of the function setting value 153 may have information about an instruction word for an applied function.

The controller 160 is configured to control various signal flows, information collection, an output of information, and the like for operating a touch function in a state where capacitance generated by the touch pen 200 is varied according to a writing pressure.

Figure 8:
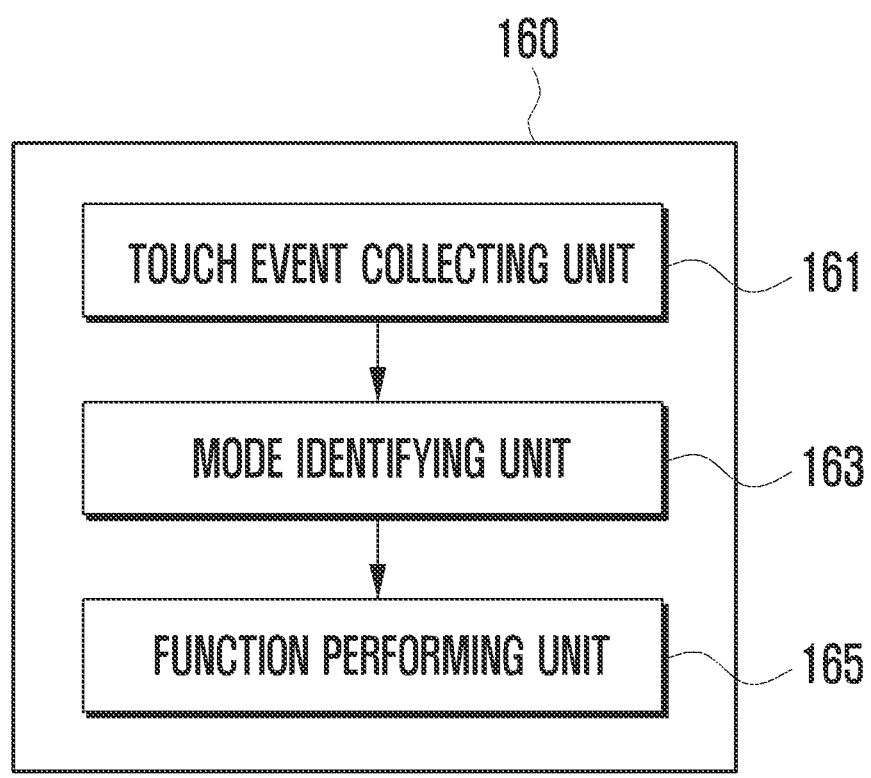
FIG. 8 is a block diagram illustrating a configuration of a controller of FIG. 7 according to an exemplary embodiment of the present invention.

FIG. 8 is a block diagram illustrating a configuration of a controller according to an exemplary embodiment of the present invention.

Referring to FIG. 8, a controller 160 may include a touch event collecting unit 161, a mode identifying unit 163 and a function performing unit 165.

The touch event collecting unit 161 is configured to monitor the touch panel 143, and to classify and distinguish signals transferred from the touch panel 143. When an input signal for activating the touch panel 143 is generated from the input unit 120, the touch event collecting unit 161 determines whether a signal corresponding to a specific touch event is generated on the touch panel 143. Additionally, when the specific touch event is generated on the touch panel 143, the touch event collecting unit 161 collects various information about the corresponding touch event. That is, the touch event collecting unit 161 collects information about capacitance variation according to a point at which the touch event is generated, a time for which the touch event is maintained, and a capacitance variation generated by the touch event generation. Furthermore, the touch event collecting unit 161 may transfer collected information to the mode identifying unit 163.

When the collected information is transferred from the event collecting unit 161 to the mode identifying unit 163, the mode identifying unit 163 identifies the current set mode. That is, the mode identifying unit 163 identifies whether the sensitive mode, in which an instruction word is generated according to a current capacitance variation, is set or released, i.e., whether the sensitive mode is activated. And, when the sensitive mode is released or not activated, the mode identifying unit 163 may transfer the collected information, except for information about a capacitance value of information of the touch event, that is information about a point at which the touch event occurs and a time period for which the touch event is maintained, to the function performing unit 165. Meanwhile, when the sensitive mode is set or activated, the mode identifying unit 163 may transfer all collected information about the touch event transferred from the touch event collecting unit 161 to the function performing unit 165.

The function performing unit 165 is configured to generate an instruction word for performing a user function based on the information about the touch event selectively transferred from the mode identifying unit 163, and to perform the specific user function based on the generated instruction word.

When the function performing unit 165 receives information about a point of the touch event and a duration time of the touch event from the mode identifying unit 163, the function performing unit 165 generates a corresponding instruction word in order to perform a user function according to the generated instruction word. For example, when a touch-down event, which is generated on the touch panel 143 and which corresponds to a touch event occurring on an icon having a specific link function, is received from the mode identifying unit 163, the function performing unit 165 controls an activation of the function linked to the corresponding icon.

Furthermore, when the function performing unit 165 receives information about the point and the duration time of the touch event, and information about the added or summed capacitance of the touch pen 200 and the touch panel 143, the function performing unit 165 may generate an instruction word corresponding to the summed capacitance. To do this, the function performing unit 165 may request for and/or refer to the function setting value 153, which includes information about instruction words, each of which is differently defined according to an amount of capacitance. When a corresponding instruction word is generated, the function performing unit 165 may perform a touch event process according to the generated instruction word. For example, when a user function, such as a line drawing, is activated by the sensitive mode, the function performing unit 165 may generate a specific instruction word according to a variation of the capacitance generated by a contact of the touch pen 200 on the touch panel 143. Accordingly, the function performing unit 165 may provide effects, such as variations of a line thickness, a line color and a line shadow, according to the corresponding instruction word.

Here, the function performing unit 165 may determine a mode variation in a case where the capacitance occurs at a predetermined value or more, and may support differently performed function applications for each capacitance variation. With reference to FIG. 3 described above, when the supplementary capacitor C1 is not connected by the switch SW, the capacitance variation generated from the touch pen 200 may be used as a boundary for simply determining whether a touch occurs. Additionally, when the supplementary capacitor C1 is connected by the switch SW, the function performing unit 165 may determine that the sensitive mode is set, such that a user function application is performed. In this case, the touch pen 200 described above may perform a function of either a general touch pen or a sensitive touch pen for supporting a sensitive mode according to either of a turn-on state or a turn-off state of the switch SW.

Meanwhile, although it is described above that the mode identifying unit 163 selectively transfers the touch event transferred from the touch event collecting unit 161 to the function performing unit 165, the present invention is not limited thereto. That is, in the controller 160, the mode identifying unit 163 may first determine whether the sensitive mode is set, and transfer the corresponding information to the event collecting unit 161. Then, the touch event collecting unit 161 may determine whether to selectively collect a part of the information about the touch event generated from the touch panel 143 according to mode setting information transferred from the mode identifying unit 163.

As described above, the terminal 100 performing a touch function support according to the above described exemplary embodiments may determine whether to operate a touch event in a state where the touch pen 200 and the touch panel 143 are touched to each other according to a set mode at the moment of a contact of the touch pen 200. Thus, the terminal of the present exemplary embodiments may support various operations of the touch pen 200 according to the user settings.

Figure 9:
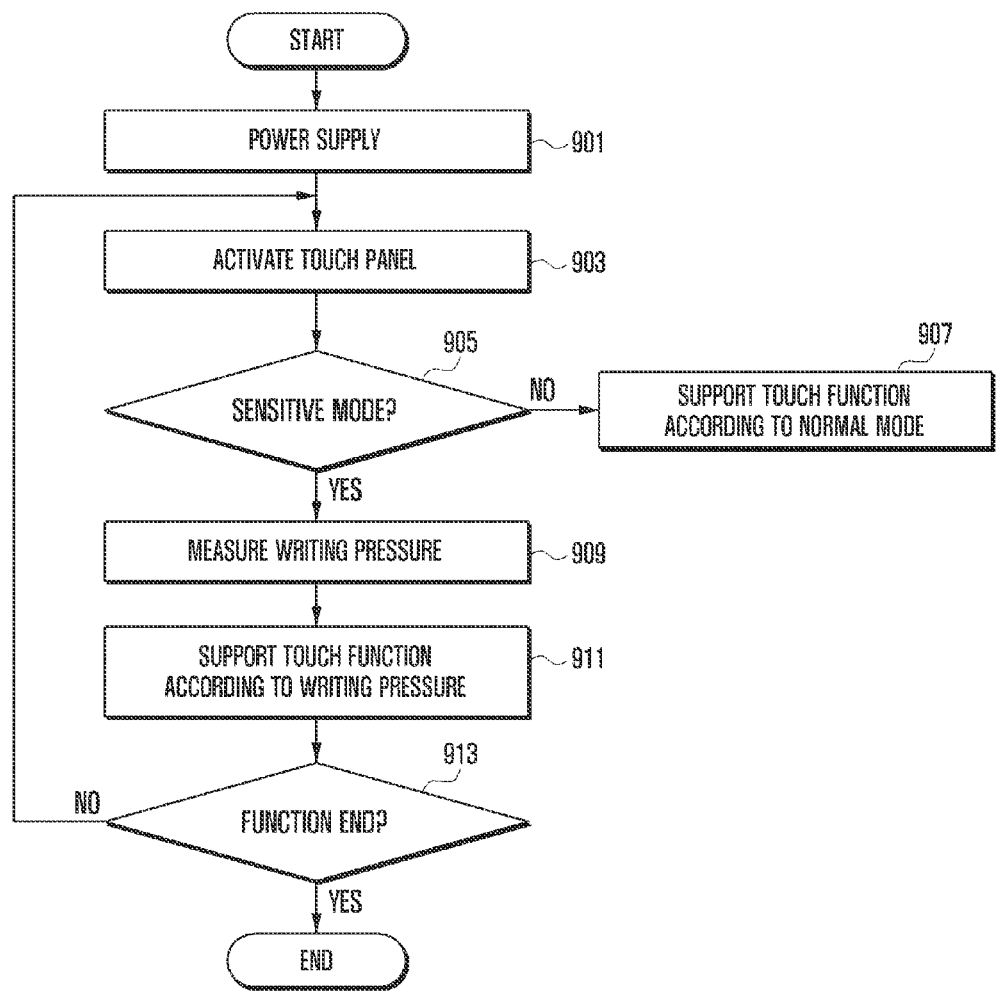
FIG. 9 is a flowchart illustrating a terminal operating method supporting a touch function according to an exemplary embodiment of the present invention.

FIG. 9 is a flowchart illustrating an operating method of a terminal in a method of supporting a touch function according to an exemplary embodiment of the present invention.

Referring to FIG. 9, in the operating method of a terminal for supporting a touch function, when electric power is provided from a power source, the controller 160 controls the provided electric power to be distributed to each element used for operating the terminal 100 in step 901.

Next, the controller 160 provides the electric power to the touch panel 143 and performs an activating procedure for operating the touch panel 143 in step 903. When the touch panel 143 is activated, the controller 160 determines whether the sensitive mode is set in step 905. Then, when the sensitive mode is not set, the controller 160 supports a touch function for a normal mode in step 907. That is, when a touch event is generated from the touch panel 143, the controller 160 may control a specific user function operation based on information about a point at which the event occurs and a duration time of the touch event without specifically identifying the capacitance.

Meanwhile, when the sensitive mode is set, as determined at step 905, then the controller 160 may control a measuring of a writing pressure of the touch pen 200 in step 909 when collecting information on the touch event. That is, the controller 160 measures a variation of the capacitance generated by the touch pen 200 and the touch panel 143. Then, the controller 160 may perform the touch function support according to the writing pressure in step 911. In further detail, the controller 160 measures the capacitance variation at the point at which the touch event is generated by the touch pen 200, and when the capacitance is varied, supports a function application according to the measured variation. Furthermore, when the capacitance of the generated touch event is varied at a predetermined value or more, the controller 160 determines that a the state of the switch SW of the touch pen 200 is changed or varied, and performs a function control according to the state of variation.

For example, the controller 160 may automatically vary a thickness of a line input according to the capacitance variation in a picture in which an information input function set by the sensitive mode is performed. In one example, the more the capacitance is increased at a specific point of the touch panel 143, the thicker the thickness of a respective line is, and the more the capacitance is decreased, the thinner the thickness of the respective line is. Furthermore, the controller 160 may assign specific colors to respective predetermined amounts of capacitance, and when a specific amount of capacitance is generated by a capacitance variation, the controller 160 may output a line having a color corresponding to the specific amount of capacitance. Next, in step 913, the controller determines whether the function has been ended and returns to step 903 in a case where the function has not been ended.

Meanwhile, when it is sensed that a degree of a capacitance variation is equal to or over a predetermined degree, that is a capacitance variation corresponds to a state of the switch SW, the controller 160 may switch a touch function performed according to a signal input from the touch pen 200 and may perform a switched and corresponding touch function. For example, the controller 160 may execute an application function that switches from a previous input function to a deleting function, wherein deleted areas differ from one another according to a capacitance variation. Thus, when a user does not delete thin lines previously input with the touch pen 200, but rather, deletes an area of a thicker line, the user provides a greater writing pressure to the touch pen 200 such that the touch pen 200 increases the capacitance.

Meanwhile, as described above, although the present exemplary embodiments perform sensing of a capacitance variation varied according a writing pressure for inputting a line in an information input function, the present invention is not limited thereto. That is, in a method of supporting a touch function of the present exemplary embodiments, the terminal 100 may generate various functions, such as various instruction words according to a capacitance variation, and may support a game function of applying and operating the game function or various applications in various functions, such as an input of information about a picture or a text, an editing function, or any other similar or suitable functions that may be performed on a terminal 100 using a touch pen 200.

Furthermore, in the above description, although it has been described that the capacitance of the touch pen 200 is increased when the writing pressure is increased, the present invention is not limited thereto. That is, the touch pen 200 may be designed such that the capacitance decreases according to the increase of writing pressure used when operating the touch pen 200.

Meanwhile, since the pressure applied by a user is generated by soft muscles of a human, it may be difficult to apply a uniform pressure to the touch pen 200. Thus, the terminal 100 may detect a capacitance of a point touched by the touch pen 200 during a predetermined time period, and may take an average of the detected values such that the corresponding capacitance is uniform. That is, the terminal 100 may divide a range of an amount of a capacitance variance by degrees and may support generating instruction words corresponding to a capacitance generated at each degree. Furthermore, the terminal 100 may generate instruction words different from one another according to a variation of the amount of capacitance without performing a specific uniformizing procedure.

As described above, according to a method for supporting a touch function, and a system and a terminal for supporting the same, the present exemplary embodiments may enhance functionality and operability of a touch pen, and may provide operation of various types of touch functions and serviceability.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supporting a touch function on a terminal, the method comprising:
    touching a touch pen to a touch panel of the terminal, the touch pen having a capacitance that corresponds to and varies with pressure applied to the touch pen;
    determining whether the terminal is operated in a sensitive mode;
    when the terminal is operated in the sensitive mode, generating, by the terminal, an instruction word corresponding to a result of adding the capacitance corresponding to the pressure applied to the touch pen when the touch pen is touched to the terminal and a capacitance of the touch panel; and
    performing a user function corresponding to the instruction word.

2. The method of claim 1, wherein the generating of the instruction word comprises:

generating a new instruction word corresponding to the capacitance of the touch pen when the capacitance is varied according to pressure variation.

3. The method of claim 2, wherein the performing of the user function corresponding to the instruction word comprises:
performing a touch function such that a shape of a line denoted on an information input screen of the terminal is varied according to variations of a touch of the touch pen and the capacitance of the touch pen; and
varying at least one of a thickness, a color, and a shade of the line according to the variation of the capacitance of the touch pen.

4. The method of claim 1, further comprising:
summing a value of a predetermined capacitance which is fixed according to a switching operation of the touch pen and the capacitance of the touch pen; and
performing a function switching procedure for supporting a previously supported touch function and another touch function in a mode according to the summed value of the predetermined capacitance and the capacitance of the touch pen.

5. The method of claim 4, wherein the performing of the function switching procedure comprises:
when the capacitance of the touch pen has a variation corresponding to contact between the touch pen and a touch panel of the terminal, generating a specific instruction word according to the corresponding variation; and
performing a switched function corresponding to the specific instruction word.

6. A system for supporting a touch function, the system comprising:
a touch pen having a capacitance of a capacitor body connected to a nib of the touch pen, the capacitance being varied according to pressure applied to the nib; and
a terminal including a touch panel which the touch pen touches, the terminal being configured to determine whether the terminal is operated in a sensitive mode and being for sensing a capacitance variation at a touch point when the terminal is operated in the sensitive mode, for generating an instruction word according to the capacitance variation, and for executing a specific user function based on the instruction word.

7. The system of claim 6, wherein the touch pen comprises:
a writing pressure variable capacitor having a capacitance which is increased or decreased according to the pressure applied to the nib; and
a case encasing the writing pressure variable capacitor and having one end at which the nib is disposed.

8. The system of claim 7, wherein the touch pen further comprises:
at least one supplementary capacitor connected in parallel to the writing pressure variable capacitor; and
a switch disposed between the at least one supplementary capacitor and the writing pressure variable capacitor for controlling a selective connection between the at least one supplementary capacitor and the writing pressure variable capacitor.

9. The system of claim 8, wherein, when a specific capacitance value which is fixed and which corresponds to the supplementary capacitor is detected during a switching operation of the touch pen, the terminal supports a previously supported touch function and a touch function in another mode according to an addition of the specific capacitance value to the capacitance of the touch pen.

10. The system of claim 9, wherein, when the terminal supports the touch function in the other mode, the capacitance of the touch pen has a variation corresponding to a contact between the touch pen and the touch panel of the terminal, and
wherein the terminal generates a specific instruction word according to the corresponding variation and performs a deleting of at least one of a portion and a whole of an information input picture displayed on the terminal, and transmitting information input through the information input picture according to the generated specific instruction word.

11. The system of claim 7, wherein, when the capacitance of the touch pen is varied according to the pressure applied to the nib, the terminal generates an instruction word corresponding to the varied capacitance of the touch pen and supports an operation of a specific touch function based on the instruction word.

12. The system of claim 11, wherein the operation of the specific touch function includes operating a function of variably showing a shape of a line denoted on an information input screen according to variations of a contact of the touch pen and the varied capacitance of the touch pen.

13. A touch pen for supporting a touch function of a terminal having a touch screen, the touch pen comprising:
a case;
a nib disposed so as to protrude from an end of the case;
a writing pressure variable capacitor having a capacitor body, a capacitance of the writing pressure variable capacitor being varied according to pressure applied to the nib; and
a switch, disposed between the at least one supplementary capacitor and the writing pressure variable capacitor, for controlling a selective connection between the at least one supplementary capacitor and the writing pressure variable capacitor.

14. The touch pen of claim 13, further comprising:
at least one supplementary capacitor connected in parallel to the writing pressure variable capacitor; and
an elastic assembly for providing elasticity to allow the nib to return to a previous position when the nib moves according to pressure applied to the nib,
wherein, when pressure is applied to the capacitor body, the capacitor body is configured to close or increase a distance between conductive electrode plates of the writing pressure variable capacitor.

15. A terminal for supporting a touch function using a touch pen, the terminal comprising:
a touch panel to which the touch pen is touched, the touch pen generating a capacitance that is varied according to pressure applied to a nib of the touch pen, the nib being disposed at one end of the touch pen; and
a controller for determining whether the terminal is operated in a sensitive mode and detecting a capacitance variation generated by a touch event of the touch pen at a specific point of the touch panel when the terminal is operated in the sensitive mode, for generating an instruction word corresponding to the detected capacitance variation, and for controlling an execution of a specific touch function that is performed according to the detected capacitance variation.

16. The terminal of claim 15,
wherein the controller detects the capacitance variation by the touch event, and
wherein the controller generates an instruction word according to the capacitance variation.

17. The terminal of claim 16, wherein the controller stops detecting the capacitance variation by the touch event when the terminal is not operated in the sensitive mode, and wherein the controller generates an instruction word according to whether the touch event occurs.

18. The terminal of claim 15, further comprising:
a display panel for displaying a line,
wherein a type of the line is varied according to variations of a touch of the touch pen and the capacitance of the touch pen.

19. The terminal of claim 18, wherein at least one of a thickness of the line, a color of the line and a shade of the line is varied according to the variation of the capacitance of the touch pen.

20. The terminal of claim 19, wherein, when a fixed specific capacitance value is added according to a switching operation of the touch pen, the controller is for executing a previously supported touch function and a touch function of another mode according to the addition of the fixed specific capacitance value.

* * * * *